United States Patent
Occchipinti et al.

(10) Patent No.: US 6,842,745 B2
(45) Date of Patent: Jan. 11, 2005

(54) PROGRAMMABLE CHAOS GENERATOR AND PROCESS FOR USE THEREOF

(75) Inventors: Luigi Occhipinti, Ragusa (IT); Luigi Fortuna, Syracuse (IT); Alessandro Rizzo, Acireale (IT); Mattia Frasca, Catania (IT)

(73) Assignee: STMicroelectronics S.r.l., Agrate Brainza (IT)

( * ) Notice: Subject to any disclaimer, the term of this patent is extended or adjusted under 35 U.S.C. 154(b) by 361 days.

(21) Appl. No.: 10/042,776

(22) Filed: Jan. 9, 2002

(65) Prior Publication Data

US 2002/0154677 A1 Oct. 24, 2002

(30) Foreign Application Priority Data

Jan. 12, 2001 (EP) .............................................. 01830015

(51) Int. Cl.[7] .......................... G06E 1/00; G06F 15/18; G11C 27/02
(52) U.S. Cl. ............................... 706/17; 706/41; 327/94
(58) Field of Search ........................ 706/17, 41; 327/94

(56) References Cited

U.S. PATENT DOCUMENTS

| 5,517,139 A | * | 5/1996 | Chung et al. ................. 327/94 |
| 5,745,655 A | * | 4/1998 | Chung et al. ................. 706/33 |
| 6,047,276 A | * | 4/2000 | Manganaro et al. ........... 706/17 |

FOREIGN PATENT DOCUMENTS

| WO | 00/04685 | 1/2000 | ........... H04L/27/00 |
| WO | 00/72541 | 11/2000 | ........... H04L/27/00 |

OTHER PUBLICATIONS

Grassi et al, "Synchronization of Hyperchaotic Cellular Neural networks, a system Theory Approch",IEEE proceedings of the International Joint Conference on World Congress on Computational Intelligence, May 1998.*

Mayer–Kress etal, "Musical Signals from Chuas Circuit" IEEE Transaction on Circuits and Systems, Oct. 1993.*

Caponetto et al. "Experimental Study on Chaotic Synchronisation with Non–Ideal Transmission Channel", IEEE Global Telecommunications Conference, Nov. 18–22, 1996, pp. 2083–2087, XP000748812.

* cited by examiner

Primary Examiner—George B. Davis
(74) Attorney, Agent, or Firm—Allen, Dyer, Doppelt Milbrath & Gilchrist, P.A.; Lisa K. Jorgenson (57) ABSTRACT

A chaotic signal generator includes a set of elements connected together for generating chaotic signals. The connection scheme may correspond to the circuit generally referred to as Chua's circuit, particularly when implemented as a cellular neural network. Interposed in the connection scheme is at least one switch, such as a MOS transistor. Opening and closing of the switch causes variation in the chaotic dynamics of the generated signals. A command signal applied to the switch may correspond to a modulating signal for transmission on a channel, such as a high noise channel. The modulating signal may be a binary signal, and the command signal may be a switching signal having a frequency that increases or decreases depending on the logic level of the binary signal.

33 Claims, 4 Drawing Sheets

PROGRAMMABLE CHAOS GENERATOR AND PROCESS FOR USE THEREOF

FIELD OF THE INVENTION

The present invention relates to signal generators, and more particularly, to a signal generator having chaotic dynamics that may be used for communications in noisy environments.

BACKGROUND OF THE INVENTION

Modern communication systems, and in particular, telecommunication systems, are usually classified according to factors such as the nature of the signal (digital or analog) used by the systems, the type of transmission, the transmission medium, the type of channel, and the nature of the receiver.

The basic objective of any communication system is to ensure that the information entered on the transmission channel is received correctly or, better still, efficiently. The purpose is to obtain, at the receiver, information that is as close as possible to the information transmitted.

If an ideal transmission channel were available, no particular measures would have to be taken to achieve the abovementioned result. However, all transmission channels have to deal with some sort of disturbance. The nature of this disturbance may vary according to the type of channel, the environmental and weather conditions in which the transmission takes place, and the frequency and nature (digital or analog) of the signal. In addition, an important source of disturbance is represented by the possible presence of various transmitters operating in the same environment. The various sources of information thus available are often indistinguishable by the receiver, thus giving rise to problems of mismatching which frequently go well beyond normal problems of interference.

As far as the transmission of digital signals is concerned, such signals expressed in the form of a sequence of symbols may be converted into an analog waveform by a modulation process, and are then transmitted on a corresponding channel. At the receiver, a demodulator reconstructs the transmitted sequence of symbols. Transmission efficiency is normally identified as bit error probability, or bit error rate (BER), i.e., as the number of erroneous bits over the total bits transmitted.

To keep the BER low, it is known that symbol redundancy can be introduced at the upstream of the modulator. In this way, a larger number of symbols than what would strictly be required is transmitted, which leads to an increased band occupation. The redundancy is added by a channel encoder and is removed by a channel decoder at the receiver end. Another approach for reducing the BER includes increasing the amount of energy associated to each symbol. This may be done by transmitting each symbol at a higher power or by protracting the duration of the transmission interval of each symbol.

A communication system may be defined as robust when the information reconstructed at the receiver is correct irrespective of the type of channel, the type of noise present on the channel, and other sources of disturbance. The robustness of a communication system hence represents an element of fundamental importance when the conditions in which the communication is made are unsatisfactory or adverse.

One of the approaches developed for creating robust communication systems involves chaotic systems used in the framework of various transmission schemes. By exploiting the properties of chaotic signals, information is transmitted on a noisy channel by a chaotic encoding with known spread spectrum characteristics and with known advantages in terms of rejection of disturbance, interference and other noisy channel effects.

Basically, two main approaches to chaotic transmission may be distinguished. It is possible to adopt both coherent schemes based on synchronization between the transmitter and the receiver, and non-coherent schemes which are not based on synchronization properties and which prove useful in the case of weak propagation, when synchronization may often get lost. The latter transmission schemes, i.e., the non-coherent ones, are the ones more useful in the case of communications in high-noise environments. They do not call for synchronization between the transmitter and the receiver, and this enables better performance to be provided in the presence of high noise levels.

Over the years, non-coherent schemes have undergone an evolution from very straightforward approaches, such as Chaotic On-Off Keying (COOK) and Chaotic Shift Keying (CSK), towards more complex approaches based on configurations of a differential type, such as Differential Chaos Shift Keying (DCSK) and Frequency Modulation Differential Chaos Shift Keying (FM-DCSK).

In most of the non-coherent techniques the transmitter is required to switch between transmission conditions of different chaotic attractors. This result may be obtained by designing and implementing various chaotic systems, or by using a chaotic system that admits more than one attractor.

In the latter case, switching between the various attractors is normally achieved by fine tuning of the system parameters. Very often this result is neither easy nor straightforward to achieve, especially in the case of chaotic communications where switching between the attractors must be performed in real time. When dealing with real circuits, this corresponds to changing at least one circuit parameter (for example, an RC couple), which results in rather complex operating criteria, particularly in the case of integrated circuits.

SUMMARY OF THE INVENTION

There thus exists the need for generating chaotic signals that are able to meet, in a relatively straightforward way, the needs highlighted above, and in particular, to the application in real-time contexts and to the implementation at the integrated circuit level.

According to the present invention, this is achieved by a chaotic signal generator comprising a plurality of signal generating elements connected together, and at least one switch is interposed in the connection of the plurality of signal generating elements and which is selectively switched between an open state and a closed state so that chaotic signals are generated. At least one of the plurality of signal generating elements is excluded from the connection of the plurality of signal generating elements when the switch is in at least one of the open and closed states so that opening and closing the switch causes the chaotic signals to vary.

The invention thus enables a circuit to be made, which is able to switch between various types of chaotic dynamics, according to the frequency of a command signal. The invention overcomes the problem represented by the need to have available two or more chaotic circuits to switch between, or else the need to achieve a real-time fine tuning of the circuit parameters.

In the embodiment currently preferred, the invention, developed with particular attention to application in the context of chaotic communications in noisy environments, is based upon a straightforward modification of the well known Chua's circuit as described, for example, in the works by R. N. Madan, [1993], "Chua's Circuit: A Paradigm For Chaos", World Scientific Series on Nonlinear Sciences, Series B, Vol. 1 (World Scientific, Singapore), and G. Manganaro, P. Arena, L. Fortuna, [1991], "Cellular Neural Networks: Chaos, Complexity And VLSI Processing", Springer-Verlag, ISBN 3-540-65203-7, with the latter work also being important with regards to the implementation at a cellular neural network (CNN) level.

BRIEF DESCRIPTION OF THE DRAWINGS

The invention will now be described, purely by way of a non-limiting example, with reference to the attached drawings, in which.

DETAILED DESCRIPTION OF THE PREFERRED EMBODIMENTS

Figure 1:
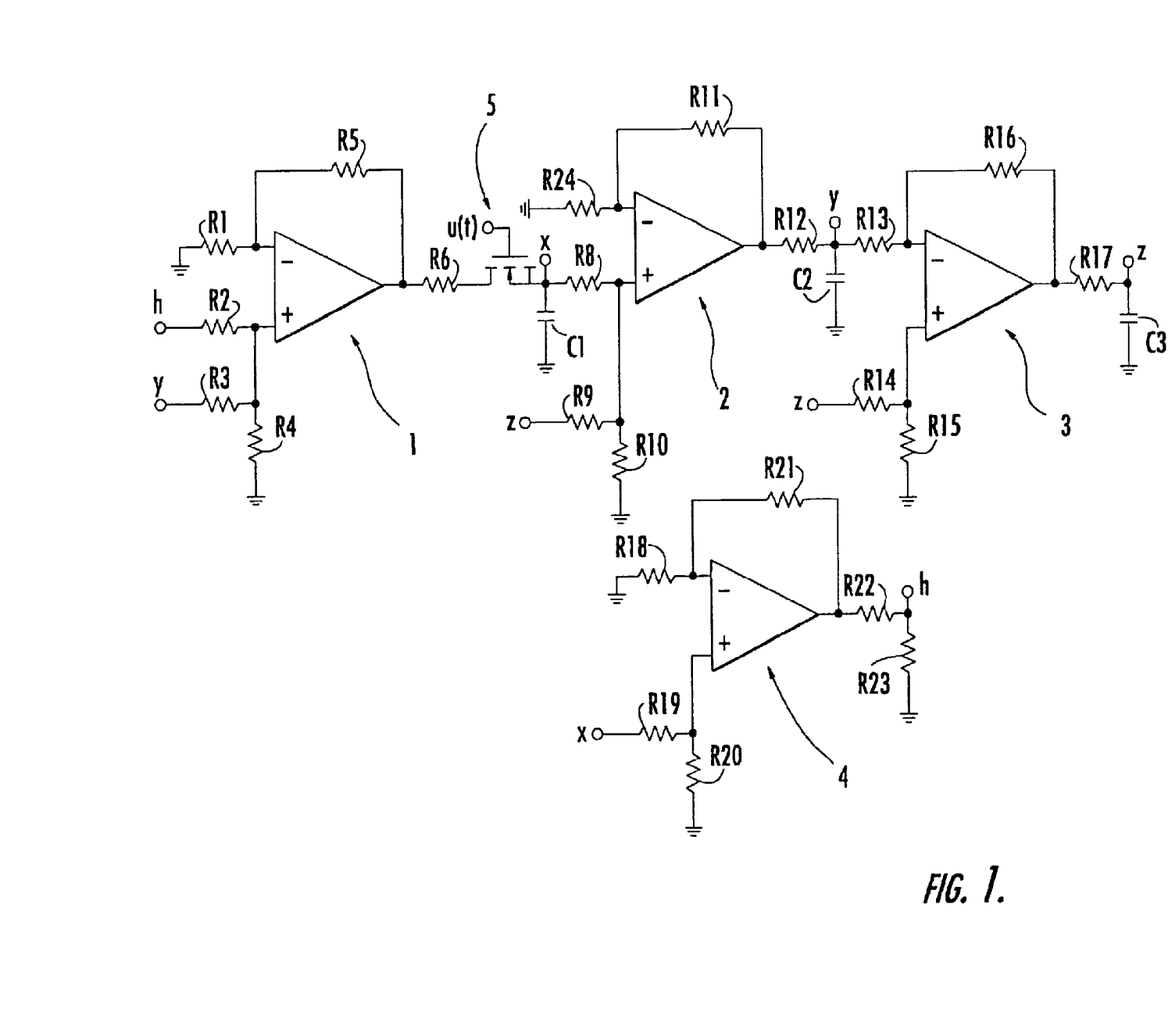
FIG. 1 is a diagram of Chua's circuit modified according to the invention.

FIG. 1 is a diagram of one embodiment of the circuit for generating chaotic signals. This scheme is known as Chua's circuit. In particular, the diagram of FIG. 1 shows how this previously known approach may be modified to implement the invention. The circuit is illustrated as a state controlled cellular neural network (SC-CNN), as is described, for example, in the work by Manganaro et al. referred to previously.

Chua's circuit represented in FIG. 1 is made up of essentially four cells designated by 1, 2, 3 and 4. In particular, the cells 1 to 3 may be viewed as three cascaded cells, with the output signal of one cell supplying the input of the next cell. The cell 4 may instead be viewed as a feedback element. In this regard, note the connections with the cell 1 and the cell 2, designated by h and x, respectively.

The core of each of the cells 1 to 4 includes a differential amplifier (e.g., an operational amplifier) with negative feedback between the output and the negative input. The corresponding circuit configuration, which comprises in addition to the operational amplifiers, resistors designated by R1 to R24, as well as three capacitors designated by C1 to C3, as illustrated in FIG. 1 and readily understood by those skilled in the art. Consequently, these components do not require a detailed description herein.

In this connection, it should be recalled yet again that the Chua's circuit in question forms (except for the presence of the switch 5, which will be described below) an approach that is well known to those skilled in the art. All of what has been said so far forms, moreover, just one example of the various possible embodiments of the invention.

With reference to its traditional implementation, the equations of the circuit represented in FIG. 1 (with the exception, again, of the switch 5) are the ones represented in non-dimensional form by the following set of formulas:

$$dx/dt = \alpha[y - h(x)]$$

$$dy/dt = x - y + z$$

$$dz/dt = -\beta * y$$

$$h(x) = m_1 * x + 0.5 * (m_0 - m_1) * [|x+1| - |x-1|]$$

The illustrated embodiment of the invention inserts at the connection between the output of the cell 1 and the input of the cell 2 a switch 5 comprising, for example, an electronic switch such as a transistor. The function of the switch 5 is basically that of separating selectively the cell 1 from the rest of the circuit in such a way as to enable switching of the circuit in a continuous way between a two-cell operating scheme and the traditional three-cell operating scheme, and vice versa. When a two-cell or three-cell operation is referred to, this corresponds to referring mainly to the three cells 1, 2 and 3 cascaded together in the diagram of FIG. 1.

Assuming the presence of the switch 5, the equations seen previously may be re-written in the following form:

$$dx/dt = u(t) * \alpha[y - h(x)] + [1 - u(t)] * (-x/\tau)$$

$$dy/dt = x - y + z$$

$$dz/dt = -\beta * y$$

$$h(x) = m_1 * x + 0.5 * (m_0 - m_1) * [|x+1| - |x-1|]$$

The modified circuit thus created differs from the traditional one by the presence of the quantities u(t) and $\tau$. The signal u(t) corresponds to the command signal for opening and closing the switch 5. The signal u(t) can thus enable the circuit to switch between two different dynamics. The parameter $\tau$ represents the normalized time constant that regulates discharging of the capacitor associated to the variable x when the switch 5 is opened.

Preferably, the MOS transistor is driven to function in the non-linear regions. Consequently, it may be either open (off) or closed (on) depending upon the driving signal u(t) chosen as a square-wave signal, and in particular, as a square-wave signal with a frequency $f_u$. The values of the parameters in the second set of formulas are preferably implemented as follows:

$\alpha = 9$      $m_0 = -\frac{1}{7}$ $\beta = 14.286$      $m_1 = \frac{2}{7}$ in such a way as to preserve the double-scroll type behavior of the original system. The value of $\tau$ is, instead, chosen as 150.

When the switch 5 (here represented by a MOS transistor) is closed, the circuit illustrated in FIG. 1 corresponds to the normal Chua's circuit. Instead, when the switch 5 is open, the capacitor which integrates the first equation seen previously is isolated with respect to its current input, and consequently discharges. This fact may be readily understood if it is noted that, in the case of u(t)=1, the second set of equations seen previously corresponds exactly to the first set of equations, which describes the behavior of the standard Chua's circuit.

When u(t)=0 (switch open), the first equation of the second set of equations seen previously is uncoupled from the two subsequent equations. Consequently, the solution described integrates a generator of chaotic signals which comprises a set of elements for signal generation, i.e., the cells 1 to 4, connected together according to a scheme of chaotic dynamics for signal generation.

The switch 5 is inserted in the scheme of connection of the above described elements and may be selectively switched between a closed state and an open state. When the switch 5 is in the open state, at least one part of the above described signal generating elements (e.g., cell 1) is excluded from the connection scheme. Opening and closing of the switch 5 thus determines variation in the chaotic dynamics of signal generation.

It will moreover be appreciated that, if the circuit of FIG. 1 were to be kept constantly in the operating condition corresponding to opening of the switch 5, a dynamics of a chaotic type would not be obtained. However, on account of the fact that the signal u(t) undergoes continuous switching (typically using signal u(t) as a square-wave signal with frequency $f_u$), it is possible to obtain different dynamics, as described in what follows.

For example, a number of experiments have been conducted by the applicant, causing the frequency $f_u$ of the waveform u(t) to vary from 250 Hz to 6 kHz. This range of frequencies forms the main part of the frequency spectrum of the Chua's circuit of FIG. 1 implemented with the following resistances (expressed in ohms) and capacitances (expressed in farads):

| | |
|---|---|
| R1 = 4 k | R13 = 8.2 k |
| R2 = 13.3 k | R14 = 100 k |
| R3 = 5.6 k | R15 = 7.8 k |
| R4 = 20 k | R16 = 100 k |
| R5 = 20 k | R17 = 1 k |
| R6 = 380 | R18 = 75 k |
| — | R19 = 75 k |
| R8 = 100 k | R20 = 1000 k |
| R9 = 100 k | R21 = 1000 k |
| R10 = 100 k | R22 = 12.1 k |
| R11 = 100 k | R23 = 1 k |
| R12 = 1 k | R24 = 51.1 k |
| C1 = 100 nF | |
| C2 = 100 nF | |
| C3 = 100 nF | |

It has been found that the behavior of the system is different in the case of low frequency operation (250 Hz–1 kHz) and operation at higher frequencies (1 kHz–6 kHz). In particular, when the frequency $f_u$ of u(t) is low, there remains the double-scroll type attractor typical of the Chua's circuit. But if the frequency $f_u$ is increased, then only a single state attractor is visible. When $f_u$ varies in this region, it is possible to note either a chaotic attractor or a periodic orbit.

FIG. 2 illustrates a number of examples of trajectories in the x-y phase plane, together with their respective spectra both for the original circuit and for the circuit switched by the signal u(t). In particular, FIG. 2(a) refers to the double-scroll attractor typical of the Chua's circuit, and FIG. 2(b) corresponds to the fast Fourier transform (FFT) of the component x.

Figure 2A:
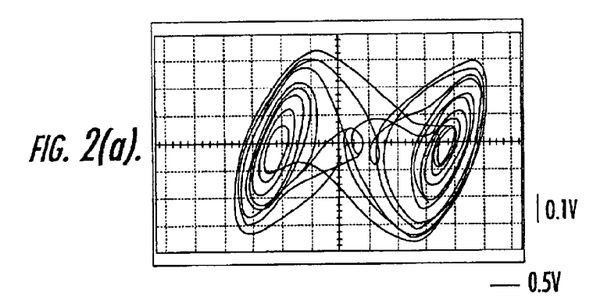
FIGS. 2(a), 2(b), (2c), 2(d), 2(e) and 2(f) group together various diagrams representing the behavior of a circuit according to the invention.
Figure 2B:
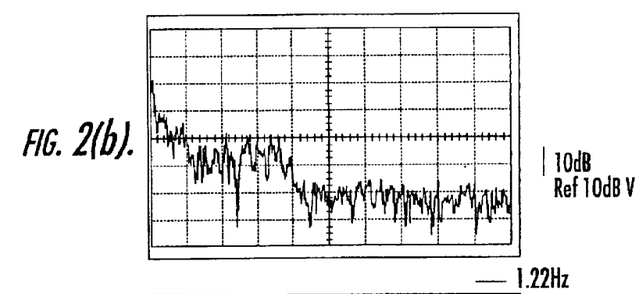
Figure 2C:
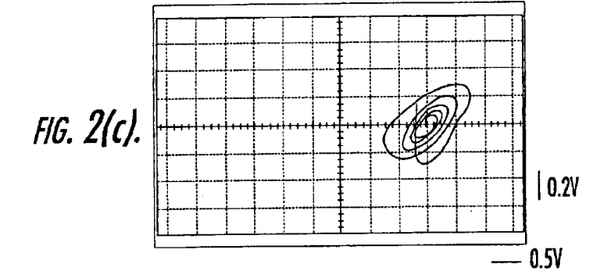
Figure 2D:
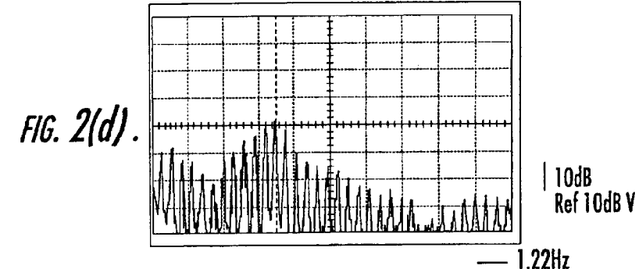

The diagrams of FIGS. 2(c) and 2(d) refer (again in relation to the behavior in the x-y plane and to the FFT of the component x) to the behavior found with a signal u(t) having a frequency $f_u$ of 488 Hz. The diagrams of FIGS. 2(c) and 2(d) refer, instead, to the common behavior found with a signal u(t) having a frequency $f_u$ of 356 Hz.

Figures 3A, 3C:
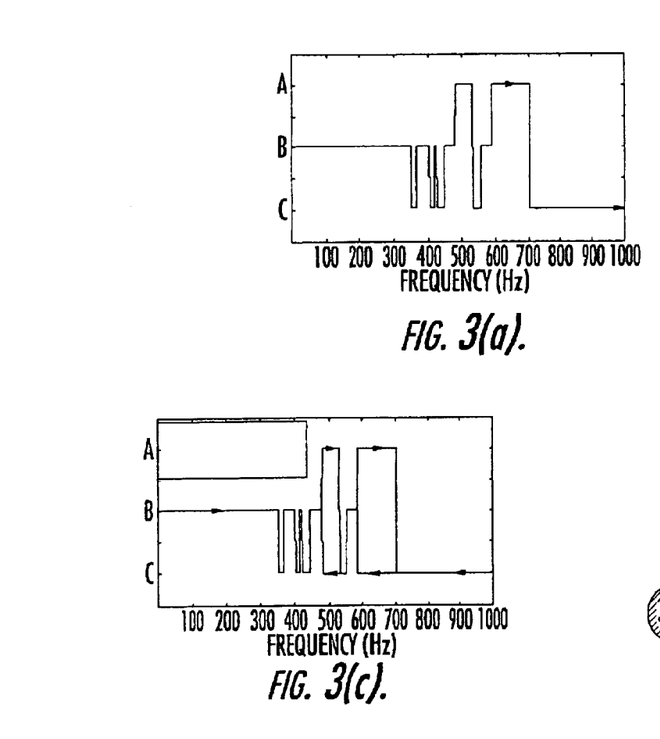
FIGS. 3(a), 3(b) and 3(c) represent the behavior of the same circuit according to the invention in the presence of an increasing or decreasing driving frequency.
Figure 3B:
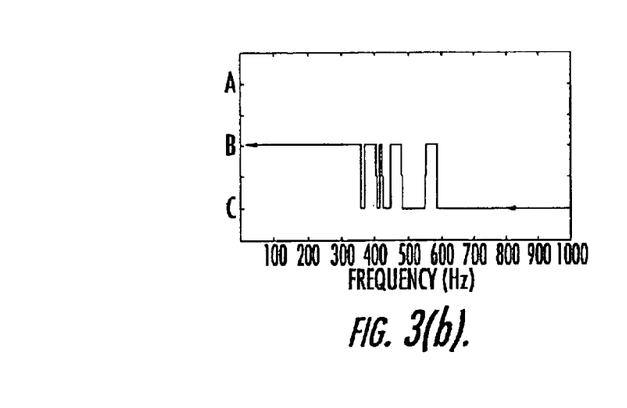

The behavior of the circuit shown in FIG. 1 differs according to whether the frequency $f_u$ increases or decreases, thus revealing a hysteretic behavior. In particular, the diagram of FIG. 3(a) shows the behavior of the circuit when the frequency $f_u$ is increased starting from a value of 250 Hz up to 1 kHz. The diagram of FIG. 3(b) illustrates, instead, the behavior of the circuit when the frequency $f_u$ is decreased starting from the value of 1 kHz down to 250 Hz.

The symbols A, B and C appearing on the ordinate correspond to three different behaviors that may be encountered (see again also FIG. 2). In particular, region A indicates that the state trajectory is bounded in the region x>0. Region C refers, instead, to an attractor bounded in the region x<0. Finally, region B indicates that the trajectory is not bounded in either of the aforesaid regions.

The analysis documented refers only to the region of the phase plane in which the attractor is confined, but does not indicate the presence of chaos. Irrespective of the region in which the dynamics evolves, it is possible to observe both chaotic behaviors and periodic behaviors. In fact, FIG. 3(b), which is obtained for decreasing frequencies, does not reveal the region A.

There remains the fact that the behavior of the circuit differs according to whether the frequency $f_u$ increases or decreases, a fact which reveals a hysteretic behavior. This result is further highlighted in the diagram of FIG. 3(c), which illustrates the behavior of the circuit depending upon the frequency. The considerations expressed above are confirmed also if the behavior at higher frequencies (for example, from 1 kHz to 6 kHz) is observed, which emerges from the various parts of FIG. 4.

Figure 4A:
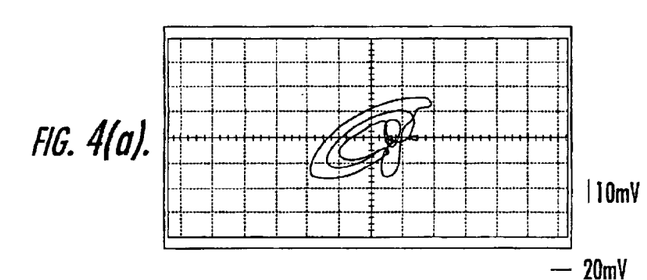
FIGS. 4(a), 4(b), 4(c), 4(d), 4(e) and 4(f) represent the dynamic behavior of the circuit according to the invention for different values of the driving frequency.
Figure 4B:
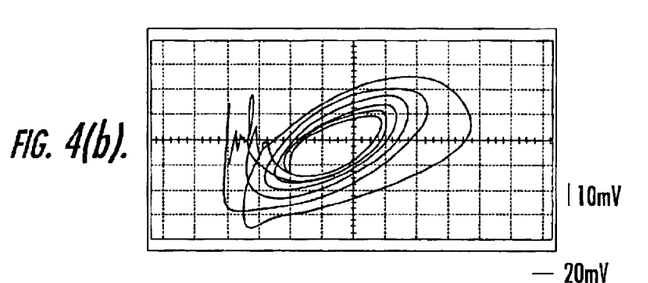
Figure 4C:
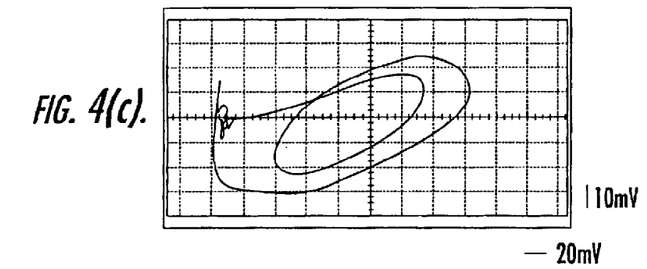
Figure 4D:
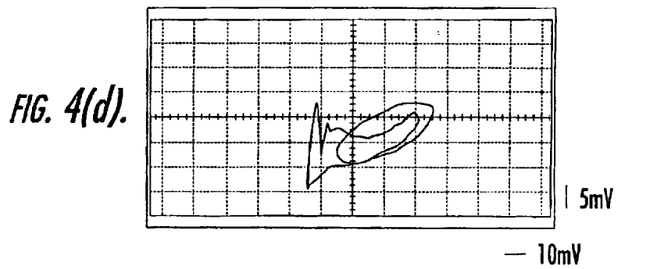
Figure 4E:
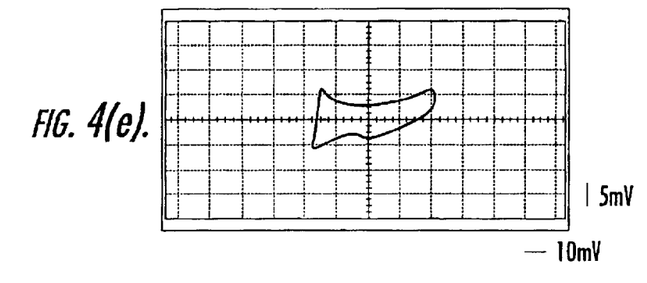
Figure 4F:
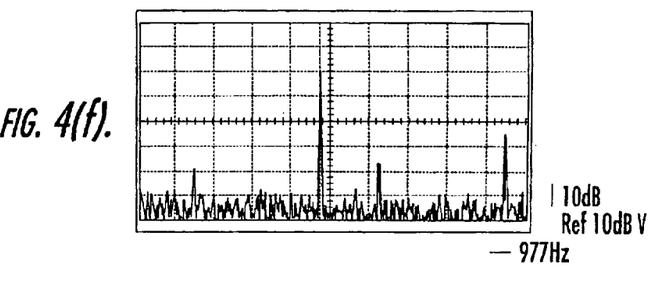

In particular, FIGS. 4(a) to 4(e) correspond to the behavior in the x-y plane for values of the frequency $f_u$ of the signal u(t) respectively of 700, 786, 1146, 1370, and 3250 Hz. FIG. 4(f) represents the FFT of the component x in the case of FIG. 4(e), namely, for $f_u$=3250 Hz.

As compared to the low frequency behavior, at least two differences may be noted. In the first place, it may be noted that the oscillations of the system have smaller amplitudes than those obtained at low frequency. This fact can be seen clearly, for example, in FIGS. 4(d) and 4(e), where the difference in the scales may be seen. Furthermore, when the frequency $f_u$ increases above a certain value, the circuit tends to present a less chaotic behavior, as may be seen in FIGS. 4(e) and 4(f). In this case, the oscillations are quite regular.

It should be recalled that in FIG. 1, which is directed to an approach in which, except for the switch 5, the other elements of the circuit correspond to the traditional implementation of the Chua's circuit. One embodiment of application of the invention is illustrated in FIG. 1, in view of the fact that the same approach may be applied to circuits generating chaotic signals having an altogether different structure.

Figure 5:
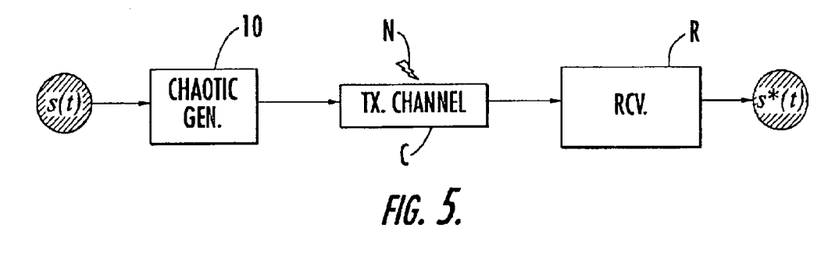
FIG. 5 is a block diagram illustrating the structure of a communication system operating according to the invention.

FIG. 5 illustrates the application of such a circuit in the framework of a communication system. It is assumed that in such a system a signal s(t) containing the information to be transmitted is sent on a transmission channel C (which in general is noisy due to the presence of noise N) causing it to travel through the chaotic generator described previously and designated by 10.

The signal s(t) can be used as a frequency modulation input signal, or else as a digital signal for controlling transition between different dynamics/attractors of a chaotic type. The corresponding discriminator R (e.g., the receiver) is of a non-coherent type, in so far as it is able to reconstruct, as received signal s*(t), the original signal s(t). The foregoing is based upon the transition noted in the chaotic signal received by the channel.

Figure 2E:
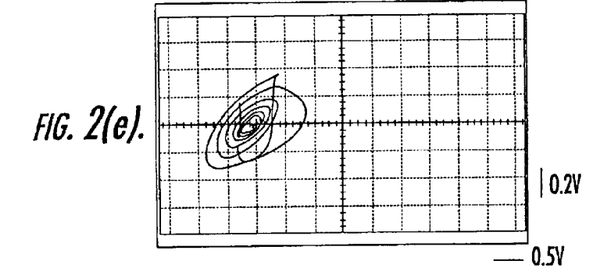
Figure 2F:
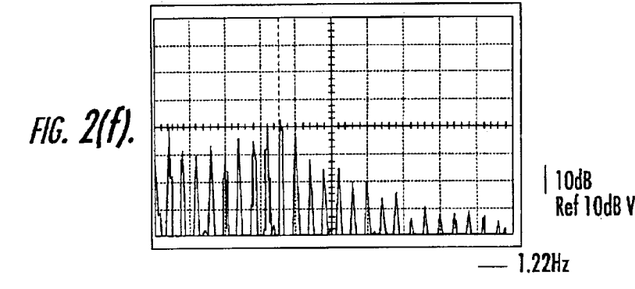

For example, with reference to FIGS. 2(a)–2(f), the command signal s(t) may be chosen as a digital signal used for controlling, via the opening and closing command signal u(t) applied to the switch 5, the transition between the dynamics illustrated in FIGS. 2(c) and 2(d) and the dynamics illustrated in FIGS. 2(e) and 2(f).

At this point, the chaotic signal received is simply discriminated by a voltage comparator, and the output signal s*(t) forms the reconstruction of the original signal s(t). One use that is very advantageous (in regards to developing a robust transmission system) is based upon the exploitation of the hysteretic behavior of the chaotic system (see FIGS. 3(a)–3(c)).

In detail, when the latter solution is adopted, the frequency $f_u$ of the command signal u(t) is increased or decreased according to the digital information to be transmitted. For example, with reference to the binary transmission system, the frequency is increased when the symbol to be transmitted is a 1, and it is decreased when the symbol to be transmitted is a 0.

In the above case it has been found that the transition time for passing from one chaotic attractor to another is in fact much shorter than the frequency of the command signal itself and than the deviation of the latter. Also in this case it is possible to use at the receiver end the non-coherent discriminator referred to previously.

The corresponding function of generating the signal u(t) as a signal with a frequency $f_u$ which increases or decreases (according to a law of linear ramp variation or according to a chirp law of a different type) as a function of the level assumed by the signal s(t) may be performed by components (such as a voltage-controlled oscillator) that can be readily integrated with the circuit represented in FIG. 1.

In this connection, it will be moreover appreciated that the signal s(t) does not necessarily have to be a binary signal. The solution according to the invention is therefore suitable for being employed also in the framework of systems in which a number of information bits is associated to each symbol transmitted.

In general, assuming a uniform distribution of the frequency spectrum of the signal transmitted through the noisy channel, this being a characteristic mainly resulting from the use of chaotic signals, it is possible to ensure the robustness of the communication scheme with regards to channel noise, interference, multi-paths and fading effects. Of course, without prejudice to the principle of the invention, the details of construction and the embodiments may vary widely with respect to what is described and illustrated herein, without thereby departing from the scope of the present invention as defined in the attached claims.

That which is claimed is:

1. A chaotic signal generator comprising:
   a plurality of signal generating elements connected together;
   at least one switch interposed with said plurality of signal generating elements and being selectively switched between an open state and a closed state so that chaotic signals are generated; and
   at least one of said plurality of signal generating elements being excluded from the connection of said plurality of signal generating elements when said at least one switch is in at least one of the open and closed states so that opening and closing said at least one switch causes the chaotic signals to vary.

2. A chaotic signal generator according to claim 1, wherein said plurality of signal generating elements are configured as a Chu a's circuit.

3. A chaotic signal generator according to claim 1, wherein said plurality of signal generating elements comprises at least a first, a second and a third signal generating element cascaded together, and said at least one switch is between said first signal generating element and said second signal generating element.

4. A chaotic signal generator according to claim 1, wherein said plurality of signal generating elements are connected so that the chaotic signal generator is configured as a cellular neural network (CNN).

5. A chaotic signal generator according to claim 4, wherein said plurality of signal generating elements are connected so that the chaotic signal generator is configured as a state-controlled cellular neural network (SC-CNN).

6. A chaotic signal generator according to claim 1, wherein when said at least one switch remains in at least one of the open and closed states the chaotic signals are not generated.

7. A chaotic signal generator according to claim 1, wherein said at least one switch comprises an electronic switch.

8. A chaotic signal generator according to claim 7, wherein said electronic switch comprises a MOS transistor.

9. A chaotic signal generator comprising:
   a plurality of signal generating elements connected together; and
   at least one MOS transistor interposed with said plurality of signal generating elements and being repeatedly switched between a conducting state and a non-conducting state so that chaotic signals are generated;
   at least one of said plurality of signal generating elements being excluded from the connection of said plurality of signal generating elements when said at least one MOS transistor is in at least one of the conducting and non-conducting states.

10. A chaotic signal generator according to claim 9, wherein said plurality of signal generating elements are configured as a Chua's circuit.

11. A chaotic signal generator according to claim 9, wherein said plurality of signal generating elements comprises at least a first, a second and a third signal generating element cascaded together, and said at least one MOS transistor is between said first signal generating element and said second signal generating element.

12. A chaotic signal generator according to claim 9, wherein said plurality of signal generating elements are connected so that the chaotic signal generator is configured as a cellular neural network (CNN).

13. A chaotic signal generator according to claim 12, wherein said plurality of signal generating elements are connected so that the chaotic signal generator is configured as a state-controlled cellular neural network (SC-CNN).

14. A chaotic signal generator according to claim 9, wherein when said at least one MOS transistor is in at least one of the conducting and non-conducting states the chaotic signals are not generated.

15. A process for generating chaotic signals comprising:
   connecting together a plurality of signal generating elements with at least one switch interposed therebetween; and
   selectively switching the at least one switch between an open state and a closed state so that chaotic signals are generated;
   at least one of the plurality of signal generating elements being excluded from the connection of the plurality of signal generating elements when the at least one switch is in at least one of the open and closed states so that opening and closing the at least one switch causes the chaotic signals to vary.

16. A process according to claim 15, wherein the at least one switch is opened and closed responsive to a command signal corresponding to a modulating signal.

17. A process according to claim 16, wherein the modulating signal comprises a discrete-level signal, the levels of which selectively open and close the at least one switch.

18. A process according to claim 16, wherein the command signal has a frequency equal to a frequency of the modulating signal.

19. A process according to claim 16, wherein the modulating signal comprises a multi-level modulating signal, and each level of the multi-level modulating signal is associated with a frequency of the command signal.

20. A process according to claim 16, wherein the modulating signal comprises a multi-level modulating signal, and each level of the multi-level modulating signal causes a frequency of the command signal to vary.

21. A process according to claim 20, wherein the multi-level modulating signal comprises a binary modulating signal, and a frequency of the command signal increases or decreases based upon a logic level of the binary modulating signal.

22. A process according to claim 16, further comprising:
transmitting the chaotic signals on a transmission channel; and
receiving the transmitted chaotic signals and identifying the modulating signal based upon the received chaotic signals.

23. A process according to claim 22, wherein the transmitted chaotic signals are received non-coherently.

24. A process according to claim 22, further comprising observing transitions in the received chaotic signals, with variations thereof being indicative of the modulating signal.

25. A process according to claim 22, wherein the receiving comprises discriminating the received chaotic signals using a threshold comparison.

26. A process for generating chaotic signals comprising:
connecting together a plurality of signal generating elements with at least one MOS transistor interposed therebetween; and
selectively switching the at least one MOS transistor between a conducting state and a non-conducting state responsive to a command signal so that chaotic signals are generated;
at least one of the plurality of signal generating elements being excluded from the connection of the plurality of signal generating elements when the at least one MOS transistor is in at least one of the conducting and non-conducting states.

27. A process according to claim 26, wherein the command signal corresponds to a modulating signal.

28. A process according to claim 27, wherein the modulating signal comprises a discrete-level signal.

29. A process according to claim 27, wherein the command signal has a frequency equal to a frequency of the modulating signal.

30. A process according to claim 27, wherein the modulating signal comprises a multi-level modulating signal, and each level of the multi-level modulating signal is associated with a frequency of the command signal.

31. A process according to claim 27, wherein the modulating signal comprises a binary modulating signal, and a frequency of the command signal increases or decreases based upon a logic level of the binary modulating signal.

32. A process according to claim 27, further comprising:
transmitting the chaotic signals on a transmission channel; and
receiving the transmitted chaotic signals and identifying the modulating signal based upon the received chaotic signals.

33. A process according to claim 32, further comprising observing transitions in the received chaotic signals, with variations thereof being indicative of the modulating signal.

* * * * *

UNITED STATES PATENT AND TRADEMARK OFFICE
CERTIFICATE OF CORRECTION

PATENT NO. : 6,842,745 B2
DATED : January 11, 2005
INVENTOR(S) : Luigi Occhipinti et al.

It is certified that error appears in the above-identified patent and that said Letters Patent is hereby corrected as shown below:

Title page,
Item [75], Inventors, delete "Syracuse" insert -- Siracusa --
Item [73], Assignee, delete "Brainza" insert -- Brianza --
Item [56], References Cited, OTHER PUBLICAITONS, "Grassi et al." reference, delete "Approch" insert -- Approach -- "Mayer–Kress et al." reference delete "etal." insert -- et al., --

Column 7,
Line 59, delete "Chu a's" insert -- Chua's --

Signed and Sealed this

Twenty-first Day of June, 2005

JON W. DUDAS
*Director of the United States Patent and Trademark Office*